INVENTORS:
RONALD F. SCHEUERMAN
PAUL R. SCOTT
JOHN R. FRASER
BY:
THEIR AGENT

INVENTORS:
RONALD F. SCHEUERMAN
PAUL R. SCOTT
JOHN P. FRASER
BY:
THEIR AGENT

United States Patent Office 3,438,680
Patented Apr. 15, 1969

3,438,680
TRANSPORTATION OF SULFUR IN PIPELINES AS A SULFUR-AQUEOUS POLYSULFIDE SLURRY
Ronald F. Scheuerman, El Cerrito, Calif., and Paul R. Scott and John P. Fraser, Houston, Tex., assignors to Shell Oil Company, New York, N.Y., a corporation of Delaware
Filed Oct. 5, 1967, Ser. No. 673,188
Int. Cl. B65g 53/30, 53/40
U.S. Cl. 302—14       8 Claims

ABSTRACT OF THE DISCLOSURE

An improved method of transporting solid slurries through pipelines and recovering the solid product at the terminal station of the pipeline.

The invention relates to an improved and novel process for transporting solids through a pipeline. More particularly, the invention is directed to pipeline transportation of sulfur slurries over great distances and recovering pure sulfur at a terminal station.

Background of the invention

The transportation of solids such as coal, asphalt, fertilizers, ores, phosphates, sulfur and the like in slurry form in pipelines is well known in the art. In almost all cases the solid material must be prepared in a particular manner and a fluid carrier selected capable of forming stable slurries for transportation through a pipeline. Problems which may be encountered while transporting solids by pipeline include separation of the solid from the carrier fluid, plating or coating of the solid on pipeline walls, plugging of the pipeline, corrosion, viscosity changes of the slurry requiring changes in pumping power which increases operation costs, etc., which are only a few of the problems normally encountered in transporting solid slurries through pipelines.

Although the above are some of the serious problems for consideration of transporting solids through pipelines, transportation of sulfur or other solids through pipelines as slurries appears to be an economic, effective and attractive means of transportation, particularly when such materials are in remote and inaccessible areas, such as in remote parts of Canada or the United States, if the above problems are controlled or solved. A number of methods have been proposed in the art to accomplish this end such as injecting molten sulfur into water or a liquid hydrocarbon thereby forming a sulfur slurry in said carriers which are suitable for pipeline transportation. Such means for transporting sulfur generally do not overcome the corrosion or plugging problems noted above and therefore they have limited application.

It is an object of the present invention to transport sulfur efficiently by pipeline.

It is another object of the present invention to transport solid materials as slurries through pipelines.

Still another object of the present invention is to transport through a pipeline sulfur slurries without causing plugging or corrosion of the pipeline.

Still another object of this invention is to form a slurry of sulfur in an aqueous medium for pipeline transportation which is stable and is non-corrosive.

Other objects will be apparent from the following description.

Summary of the invention

The present invention provides for transportation through a pipeline of sulfur or other solids by slurrying said solids, e.g., sulfur, which are in small particle sizes in an aqueous solution of ammonium polysulfide or other polysulfide salts. The sulfur particles can be prepared by any suitable means such as by grinding, pulverizing, or crushing to desired particle size such as from less than 5 to 5000 microns and suspending or dispersing the sulfur particles in an aqueous solution of ammonium polysulfide $[(NH_4)_2(S)_x]$ where $x$ is an integer of from 2 to 8 and generally from 2 to 5. The aqueous ammonium polysulfide solution can be a saturated or nonsaturated solution, preferably a saturated one, such as a saturated water solution of ammonium polysulfide. The amount of solid sulfur particles slurried with the aqueous ammonium polysulfide can vary over a wide range, normally from at least 10% to over 75% and generally between about 30% and 60% by weight.

Thus, slurries can be prepared by forming particles of suitable dimensions and suspending or dispersing them by suitable means such as mixing with or injection into an aqueous solution of ammonium polysulfide to form a slurry of sulfur-ammonium polysulfide solution, which slurry is readily pumpable through pipelines without causing corrosion, coating or plugging of the pipeline. At the terminal station of the pipeline the sulfur is easily recoverable as essentially pure sulfur.

Brief description of the drawing

The invention can be further understood from the following flow diagrams 1 and 2 in which.

Figure 1:
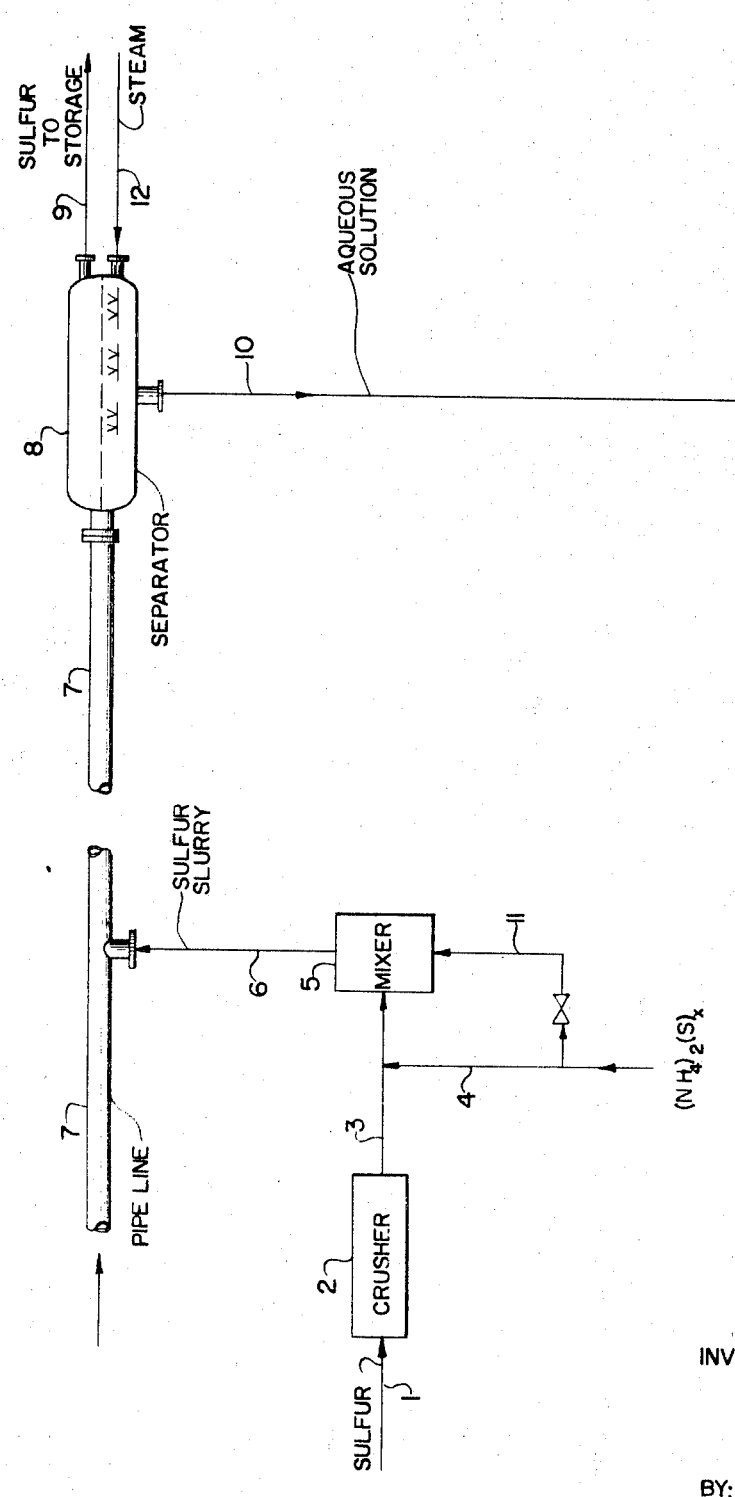
FIGURE 1 illustrates the use of crushed sulfur and FIGURE 2 illustrates the use of molten sulfur to form slurries with aqueous ammonium polysulfide solutions for pipeline transportation.

Referring to flow diagram, FIGURE 1, sulfur from source 1 is introduced into crusher or pulverizer 2 where it is reduced to small particles and conducted via a line 3 into a mixer 5. Either prior to entering mixer 5 or in mixer 5 aqueous ammonium polysulfide is introduced via line 4 or line 11 to form a sulfur slurry of solid sulfur particles in an aqueous ammonium polysulfide carrier. The slurry is conducted through line 6 into pipeline 7 for transportation to a terminal station. At the terminal end the sulfur is recovered by introducing the slurry into a separator or stripper 8 where the sulfur is removed via line 9 and the aqueous fluid removed via line 10. An effective manner of recovering the sulfur from separator 8 is to inject steam via line 12 thereby effecting good separation of the sulfur from the aqueous fluid. The ammonium products such as ammonium sulfide and hydroxide formed are removed via line 10 and discarded or further treated to recover additional sulfur and ammonium compounds.

Figure 2:
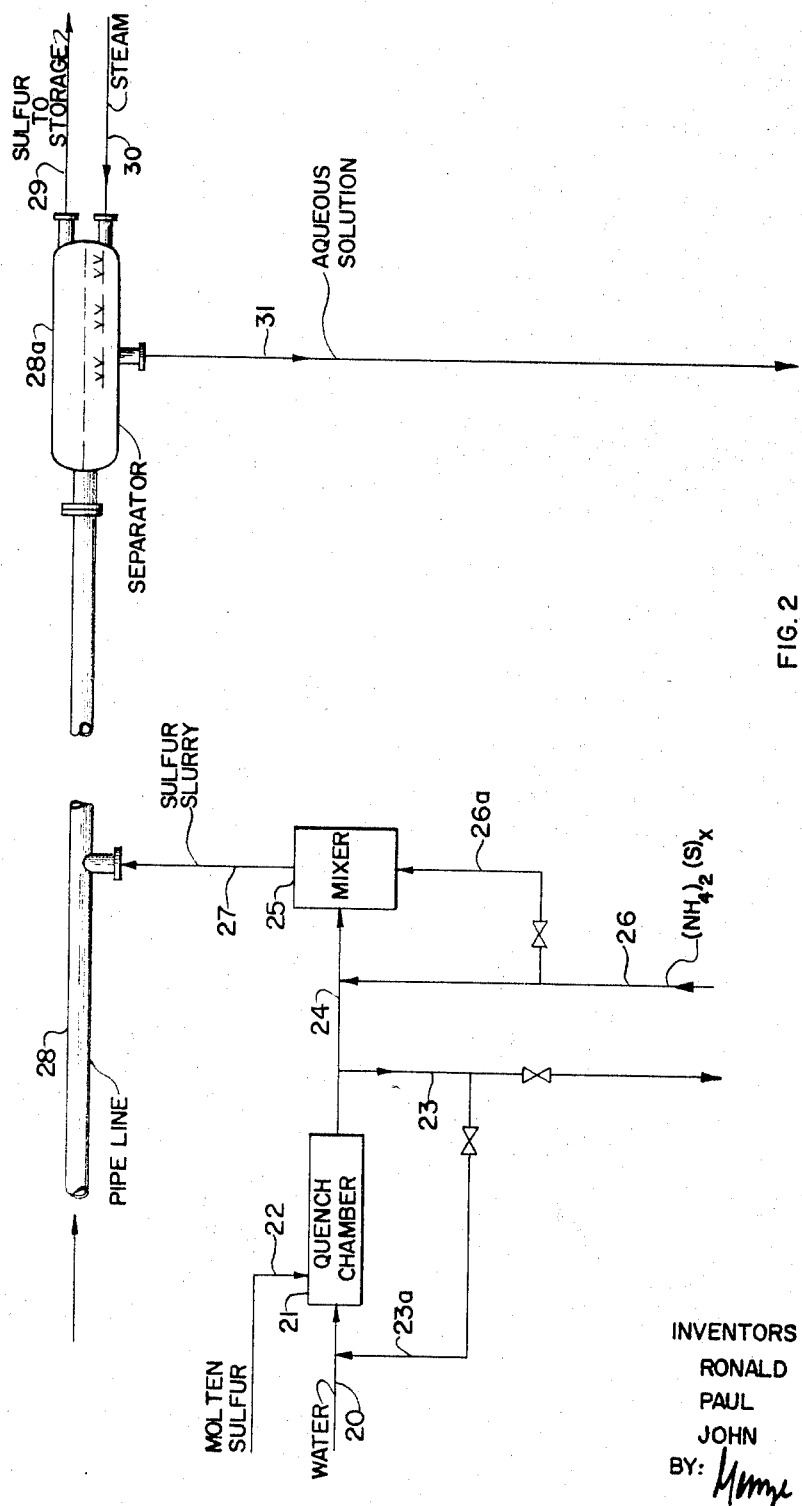

A modification of the process is illustrated by flow diagram, FIGURE 2. There water from line 20 is introduced into chamber 21 and molten sulfur is injected into the chamber 21 via line 22 to form a sulfur-water slurry. The slurry is conducted from chamber 21 into line 24 and part or all of the water can be removed via line 23 and discarded or returned to line 20 via lines 23 and 23a. The sulfur particles formed in chamber 21 are introduced into mixer 25 where the sulfur particles are slurried with an aqueous solution of ammonium polysulfide introduced into the mixer via lines 26 and 26a or the ammonium polysulfide can be introduced via line 26 into line 24 and the mixture slurried in mixer 25. The sulfur-ammonium polysulfide slurry is conducted via line 27 into pipeline 28 for transportation to a terminal station. At the terminal end of line 28 the sulfur is recovered after being introduced into separator or stripper 28a and the sulfur removed via line 29 by suitable means, e.g., settling or steam stripping, introduced via line 30. The aqueous fluid is removed via line 31 and discarded or further treated to remove sulfur and ammonium compounds.

The formation of sulfur particles by injection of molten sulfur into cold and/or hot water can be accomplished by such means as described in U.S. Patents 1,969,242, 2,658,016, 2,917,345 and 2,947,578 or British Patents 1,001,486 and 1,010,904 or any other means, the water can be removed and the sulfur particles thus produced slurried with aqueous ammonium polysulfide in accordance with the process of the present invention.

The use of aqueous ammonium polysulfide as a carrier for sulfur particles has many advantages over other carriers such as water or oil, both of which present corrosion and plugging problems, which are not encountered with the carrier of the present invention. Also, recovery of the sulfur by the process of the present invention is efficient and purification of the sulfur is not required as is the case when hydrocarbons are used as carriers or slurrying mediums.

Although aqueous ammonium polysulfide is the preferred carrier of sulfur particles or solids soluble therein, other aqueous polysulfide solutions can be used such as alkali metal polysulfide, e.g., sodium or potassium polysulfide aqueous solutions.

*Description of the preferred embodiments of the invention*

The following additional advantages are obtained as a result of the present invention:

The process permits high sulfur loading of slurry. For example, a 33% v. solid sulfur slurry in water contains 665 gm. sulfur per liter. However, a 33% v. solid sulfur slurry in a 43% w. ammonium polysulfide solution contains 945 gm. sulfur per liter, or 42% more total sulfur per unit volume of slurry. The sulfur content of the single-phase ammonium polysulfide solution (43% w.) is only 420 gm. per liter. The viscosity of a 43% w. ammonium polysulfide solution is essentially the same as water.

Aqueous polysulfide solutions have low freezing points. An aqueous 43% w. $(NH_4)_2S_5$ solution did not freeze or precipitate solids when maintained at 0° F. for several days. By using dissolved polysulfide, aqueous sulfur slurries can be safely transported through pipelines in cold climates.

Tests indicate that "plating" of sulfur on the colder pipe walls does not occur, thus avoiding a serious plugging problem. In pipeline transportation of a slurry of sulfur in a hydrocarbon (e.g., condensate), the sulfur tends to dissolve in the warmer sections of the pipeline and come out of solution in the colder sections, causing deposition or plating of sulfur on the pipe walls. This does not occur when an aqueous polysulfide solution is the liquid carrier vehicle.

We claim as our invention:

1. A process of transporting sulfur particles in an aqueous solution of a polysulfide salt through a pipeline comprising intimately mixing sulfur particles with an aqueous solution of a polysulfide salt to form a slurry, injecting and pumping the slurry through a pipeline to a terminal and removing the sulfur particles from the aqueous solution.

2. A process for transporting sulfur through a pipeline to a terminal comprising intimately mixing sulfur particles with an aqueous solution of ammonium polysulfide to form a slurry, injecting and pumping the slurry through a pipeline to a terminal and separating and removing the sulfur particles from the aqueous solution.

3. The process of claim 2 wherein the sulfur particles comprise at least 20% of the slurry and the aqueous solution of ammonium polysulfide is a saturated solution.

4. The process of claim 3 wherein the aqueous phase is water.

5. The process of claim 2 wherein the sulfur particles are obtained by injecting molten sulfur into water and recovering the sulfur particles therefrom.

6. The process of claim 2 wherein sulfur present in the slurry is present as both solid particles and in solution.

7. The process of claim 6 wherein a part of the sulfur is converted to sulfate and recovered as a solution of a solid sulfate salt.

8. The process of claim 6 wherein a part of the sulfur is converted to sulfate and recovered as a solid sulfate salt.

References Cited

UNITED STATES PATENTS

| 1,091,251 | 3/1914 | Stauffer | 302—66 |
| 2,798,772 | 7/1957 | Redcay | 302—66 |
| 2,917,345 | 12/1959 | Phillips et al. | 302—66 |
| 2,947,578 | 8/1960 | Corneil et al. | 302—66 |

ANDRES H. NIELSEN, *Primary Examiner.*

U.S. Cl. X.R.

302—66